March 13, 1962  G. H. WILLIAMS  3,024,804
CHECK VALVE
Filed Jan. 21, 1960
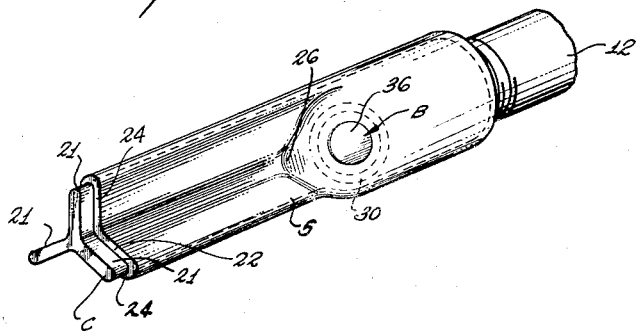
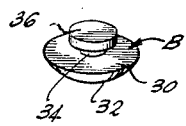
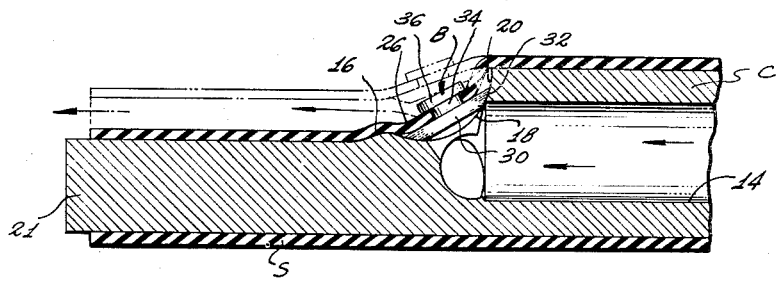
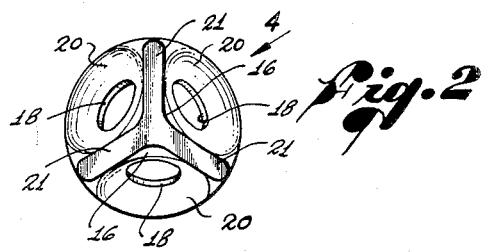
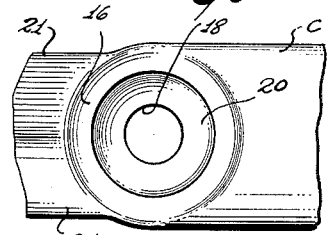
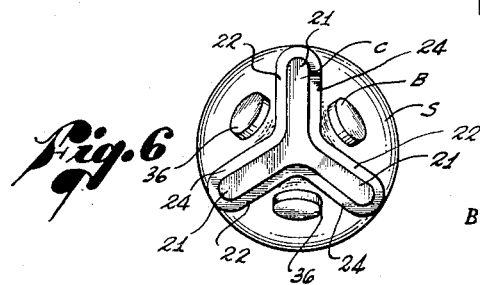
INVENTOR.
GLYNN H. WILLIAMS
BY *Fulwider Mattingly Huntley*
Attorneys 3,024,804
CHECK VALVE
Glynn H. Williams, Huntington Park, Calif., assignor to U.S. Industries, Inc., a corporation of Delaware
Filed Jan. 21, 1960, Ser. No. 3,853
4 Claims. (Cl. 137—512.15)

The present invention relates generally to the field of valves and more particularly to a new and improved check valve.

Where conventional heretofore-proposed check valves are arranged with their discharge side exposed to a comparatively high fluid pressure, backflow through the valve often occurs. This is especially true after the check valve has been in service for some time. When such backflow takes place, it becomes necessary to replace the check valve. Such replacement often presents a time-consuming and expensive problem, as for example where the check valve constitutes a part of a subterranean oil or water well pump.

It is a major object of the present invention to provide a check valve that is especially adapted for use under conditions of high fluid pressures.

Another object is to provide a check valve that will remain free of backflow over extended periods of time and hence will not necessitate other than infrequent repair or replacement.

A further object of the invention is to provide a check valve that is especially adapted for use with liquids containing solid materials, as for example sand or grit.

An additional object is to provide a check valve which is extremely simple in design and rugged of construction whereby it may afford a long and useful service life.

Yet a further object is to provide a check valve which is economical to construct as compared to conventional check valves, the check valve of the present invention readily lending itself to mass production methods.

Another object of the invention is to provide a check valve having a maximum fluid capacity for its size and weight.

It is a more particular object of the invention to provide a check valve employing a rigid core formed with a fluid outlet, a flexible self-closing lip-type sealing member on the core and unique means for preventing extrusion of the sealing member into the fluid outlet during the time the pressure exteriorly of the check valve exceeds the internal pressure to which it is subjected.

These and other objects and advantages of the present invention will become apparent from the following detailed description when taken in conjunction with the appended drawings wherein:

FIGURE 1 is a perspective view that is partially broken away, disclosing a preferred form of check valve embodying the present invention, said valve being shown in closed position;

FIGURE 2 is a front view of a core member utilized with said check valve;

FIGURE 3 is a fragmentary central sectional view of said check valve;

FIGURE 4 is a fragmentary view of the core of said valve taken from a point designated 4 in FIGURE 2;

FIGURE 5 is a perspective view of a closure element employed with said check valve; and FIGURE 6 is a front view of said valve.

Referring to the drawings, a preferred form of check valve embodying the present invention includes a generally cylindrical body or core C. This body or core C is of hollow construction and is formed of a rigid material such as metal. The rear end of the core C is secured to an inlet pipe 12. As indicated in FIGURE 3, the core C is formed with an axially extending fluid passage 14, the rear end of which receives flow through the pipe 12. The intermediate portion of the core C is formed with three radially inwardly and forwardly extending side walls each of which is designated 16. These side walls 16 are of equal dimension and are each formed with an outlet aperture 18. These outlet apertures 18 are of equal area and connect the front end of the fluid passage 14 with the space encompassing the core C. As indicated particularly in FIGURE 3, a coaxial inwardly-cupped annular cavity or seat 20 encompasses each of the outlet apertures 18. The front portion of the core C is formed with three flutes of equal dimensions, each designated 21. These flutes 21 extend radially outwardly from the longitudinal axis of the core C and are displaced from one another by an angle of 120 degrees. The front end of the flutes are normal to the longitudinal axis of the core C.

A flexible sealing member S is attached to the core C, the rear portion of this sealing member S being generally tubular so as to be telescopically received by the external walls of the core. The front portion of the sealing member S is formed with three pairs of lips each pair being designated 22 and 24. The rear portion of the lips 22 and 24 merge into a radially outwardly and rearwardly tapered intermediate section 26. The intermediate sections 26 closely overlie the side walls 16 of the core C in the relaxed condition of the sealing member. Preferably, the sealing member S will be of a natural or synthetic rubber material and will be so formed that in their relaxed position each of the pairs of lips 22 and 24 will be in abutting relationship with the exterior surfaces of its respective flute 21, as indicated in FIGURE 1. The front end of the sealing member S terminates rearwardly of the front end of the flutes 21, as will be apparent from FIGURES 1 and 3.

A closure element or button B is provided for each of the outlet apertures 18. As indicated in FIGURES 3 and 5, the closure buttons B each include a disc 30, the peripheral edge 32 of which is curved complementary in profile to the curvature profile of the seat 20 of the core C. A coaxial stem 34 is integrally formed on the disc 30. A head 36 is formed at the end of the stem 34 opposite the disc 30. Preferably, the three closure buttons B will be integrally molded into the intermediate sections 26 of the sealing member S in alignment with the outlet apertures 18.

In the operation of the aforedescribed check valve, assuming the exterior or downstream side of the valve to be exposed to a body of fluid existing at a pressure higher than that within the fluid passage 14, each of the pairs of lips 22 and 24 straddle one of the flutes and will be maintained tightly pressed against the exterior surfaces of the flutes by the pressure differential. Additionally, the closure buttons B will be held firmly seated against their complementary cavities or seats 20. Referring to FIGURE 3, it should be particularly observed that during this condition the closure buttons B will serve to positively restrain squeezing of the intermediate sections 26 of the sealing member S into the outlet apertures 18. Accordingly, these closure buttons B will prevent damage to the sealing member S from such extrusion. When the fluid pressure within the fluid passage 14 is increased over that of the fluid surrounding the check valve, outward fluid flow through the apertures 18 will take place. Such outward flow will lift the closure buttons B off their seats 20 and effect the opening of the pairs of lips 22 and 24 so as to permit fluid to pass outwardly through the spaces between these lips and the exterior surfaces of the flutes 21, as indicated by the phantom lines in FIGURE 3. Such fluid flow will continue until the pressure within the fluid passage 14 again falls below that of the fluid surrounding the check valve. The sealing member S and its closure buttons B will then return to their original positions.

It should be particularly observed that the aforedescribed check valve is especially adapted for use with fluids containing solids, such as sand or grit. This is true because even should such solid particles become lodged between the sealing lips and their respective flutes 21, the material of these lips will be sufficiently pliable to effect a sealing of the area surrounding each of the particles. The particles so trapped will be flushed forwardly through the sealing lips upon subsequent outward flow of fluid therethrough.

Various modifications and changes may be made with respect to the foregoing description without departing from the spirit of the invention or the scope of the following claims.

I claim:

1. A check valve, comprising: a core member formed at its front portion with flute means, a wall rearwardly of said flute means and a fluid passage extending rearwardly of said wall, with an outlet aperture being formed in said wall that connects said fluid passage with the exterior of said core member, and said wall also being formed with an inwardly-cupped ring-like seat coaxial with the external side of said outlet aperture; an elastic sealing member attached to said core member rearwardly of said outlet aperture and formed with self-closing sealing lips that extend approximately to but not beyond the forward edge of said flute means, said lips normally abutting in sealing relationship with the exterior surfaces of said flute means and being adapted yieldably to move away from said flute means to permit outward flow of fluid from said fluid passage through said outlet aperture; and a rigid closure button supported by said sealing member in alignment with said seat and having a peripheral edge which is curved complementary in profile to the curvature profile of said seat, said closure button moving outwardly away from said seat during outward fluid flow through said aperture and said closure button returning to engagement with said seat so as to cover said aperture when the fluid pressure on the exterior of said sealing member exceeds that existing within said fluid passage so as to prevent extrusion of said sealing member into said aperture.

2. A check valve, comprising: a core formed at its front portion with a plurality of substantially coextensive flutes, a wall rearwardly of each said flute and a fluid passage extending rearwardly of said walls, with an outlet aperture being formed in each of said walls that connects said fluid passage with the exterior of said core, and each of said walls also being formed with an inwardly-cupped ring-like seat coaxial with the external side of its respective outlet aperture; an elastic sealing member attached to said core and formed with a plurality of pairs of self-closing sealing lips that extend approximately to but not beyond the forward edges of said flutes, said lips normally straddling said flutes in sealing relationship therewith and being adapted yieldably to move away from said flutes during outward flow of fluid through said apertures to permit outward fluid flow between said flutes and said lips; and a plurality of rigid closure buttons, each supported by said member in alignment with one of said seats and having a peripheral edge which is curved complementary in profile to the curvature profile of its respective seat, each said closure button moving outwardly away from said seat during outward fluid flow through said aperture and said closure button returning to engagement with said seat so as to cover said aperture when the fluid pressure on the exterior of said sealing member exceeds that existing within said fluid passage so as to prevent extrusion of said sealing member into said outlet apertures.

3. A check valve, comprising: an axial core having a generally tubular rear portion that is connectible to a source of fluid and its front portion formed with a plurality of flutes that extend radially outwardly from the longitudinal axis of said core at substantially equi-angular spacing from one another, the portion of said core adjacent the rear of said flutes having a plurality of radially inwardly and axially extending walls located, one each, between adjacent flutes; an outlet aperture formed in each of said walls so as to connect the interior of the rear portion of said core with the latter's exterior; a flexible sealing member having a tubular rear portion affixed to said core, a radially inwardly and axially tapered intermediate portion covering said walls, and a front portion formed with a plurality of pairs of sealing lips that straddle said flutes; and a plurality of rigid closure elements, each supported in alignment with one of said outlet apertures, each said closure element moving away from its respective seat during outward fluid flow therethrough, and said closure element returning to and engaging said aperture when the fluid pressure on the exterior of said sealing member exceeds that existing within said fluid passage so as to prevent extrusion of said sealing member into said aperture.

4. A check valve, comprising: an axial core having a generally tubular rear portion that is connectible to a source of fluid and its front portion formed with a plurality of flutes that extend radially outwardly from the longitudinal axis of said core at substantially equi-angular spacing from one another, the portion of said core adjacent the rear of said flutes having a plurality of radially inwardly and forwardly extending walls located, one each, between adjacent flutes; an outlet aperture formed in each of said walls fluid connecting the interior of said tubular rear portion with the exterior of said core; an elastic sealing member having a tubular rear portion tightly fitted on said tubular rear portion of said core, a radially inwardly and forwardly extending intermediate portions covering said walls, and a front portion extending toward but stopping short of the forward edge of said core and formed with a plurality of pairs of sealing lips that normally straddle said flutes and engage in sealing relationship therewith, said lips being responsive to pressure in the interior of said tubular rear portion of said core which exceeds the pressure on its exterior of said core to yieldably move away from said lips, thereby permitting fluid to flow from the interior of said core through said apertures and thence through the passages bounded by adjacent flutes and the corresponding portions of said lips.

References Cited in the file of this patent

UNITED STATES PATENTS

| 2,766,765 | Bolanowski | Oct. 16, 1956 |
| 2,926,692 | Zillman et al. | Mar. 1, 1960 |